US012600434B2

(12) United States Patent　　　　　(10) Patent No.:　　US 12,600,434 B2

Papadopoulos et al.　　　　　　　(45) Date of Patent:　　　　Apr. 14, 2026

(54) MOORING APPARATUS

(71) Applicants: Jeremy J. Papadopoulos, Manchester (GB); Vincent Loccisano, Wellesley, MA (US)

(72) Inventors: Jeremy J. Papadopoulos, Manchester (GB); Vincent Loccisano, Wellesley, MA (US)

( * ) Notice: Subject to any disclaimer, the term of this patent is extended or adjusted under 35 U.S.C. 154(b) by 426 days.

(21) Appl. No.: 18/451,645

(22) Filed: Aug. 17, 2023

(65) Prior Publication Data

US 2024/0059376 A1　　　Feb. 22, 2024

Related U.S. Application Data

(60) Provisional application No. 63/380,273, filed on Oct. 20, 2022, provisional application No. 63/371,672, filed on Aug. 17, 2022.

(51) Int. Cl.
　　B63B 21/20　　　　(2006.01)
　　F03D 13/25　　　　(2016.01)
(52) U.S. Cl.
　　CPC ............ B63B 21/20 (2013.01); F03D 13/256 (2023.08); B63B 2021/203 (2013.01); B63B 2021/206 (2013.01); F05B 2240/93 (2013.01); F05B 2240/95 (2013.01)

(58) Field of Classification Search
　　CPC ........ B64B 2021/203; B64B 2021/206; B64B 21/20; B64B 21/04; B64B 21/50
　　See application file for complete search history.

(56)　　　　　References Cited

U.S. PATENT DOCUMENTS

2002/0189522 A1 * 12/2002 Dove ...................... B63B 21/04
　　　　　　　　　　　　　　　　　　　　　　　　114/293
2024/0409188 A1 * 12/2024 García Ferrández ... B63B 39/00

* cited by examiner

*Primary Examiner* — Timothy D Collins
*Assistant Examiner* — Justin Michael Heston
(74) *Attorney, Agent, or Firm* — Keeley DeAngelo LLP; W Scott Keeley

(57)　　　　　　ABSTRACT

A mooring line that provides substantially constant force, also referred to a mooring line that is always soft, allows the orbital motion of a moored turbine structure under varying wave conditions and is suitable for storm conditions when the turbine is not operating. A mooring line with substantially constant force does not create surge acceleration from heave acceleration and does not cause the turbine structure to be pulled through the water relative to orbital velocity.

7 Claims, 12 Drawing Sheets

200

<u>400</u>

400

600

614

619   624

613

622

_700_

MOORING APPARATUS

TECHNICAL FIELD

The present disclosure relates in general to wind turbines and more specifically to tension devices for mooring lines.

BACKGROUND

A wind turbine is a rotating machine that converts kinetic energy from wind into mechanical energy that is converted to electricity. Utility-scale, horizontal-axis wind turbines have horizontal shafts that drive a generator assembly within a tower-top nacelle, that is yawed relative to the tower in order to align the rotor with the wind. Either a transmission and generator combination or a larger direct drive generator is commonly used.

The state of the art includes offshore wind turbines that rest on the ocean bottom and are neither designed nor intended to be moved. In waters shallower than 60 m, wind turbines used for offshore applications commonly include single-tower systems mounted to the sea bed. In deeper waters the turbines must float, using spar-buoy or semi-submersible platforms, tension legs, or a large-area barge-type construction. Offshore turbines are usually connected to an onshore power grid and electrical energy produced is transferred by ocean-floor grid structures.

Wind force on a turbine results in force on the turbine structure, whether it is a tower spar-buoy, semi-submersible platform, tension legs or floating construction. When a structure is moored, the mooring line may undergo varying tension in varying wave and weather conditions. A rigid mooring line may result in the turbine being dragged through the water relative to orbital velocity. An ideal mooring line provides constant tension, allowing for circular/orbital motion under varying wave and weather conditions.

SUMMARY

A mooring line that provides substantially constant force, also referred to a mooring line that is always soft, allows the orbital motion of a moored turbine structure under varying wave conditions and is suitable for storm conditions when the turbine is not operating. A mooring line with substantially constant force does not create surge acceleration from heave acceleration and does not cause the turbine structure to be pulled through the water relative to orbital velocity.

The present embodiment is a weight coupled to a float. The downward force of the weight is substantially equal to the displacement force of the float. The float and weight, when coupled are neutrally buoyant. In one embodiment a first mooring line rises from an anchor at approximately 45° and terminates at a float. A second mooring line descends from the turbine structure, passes over a pulley at the float, and terminates at a hanging weight. Such a system provides a constant line tension of a force equal to the force of the weight plus the displacement force of the float.

In another embodiment an apparatus provides a force that increases slowly as the turbine moves. A parallelogram linkage is comprised of rigid members joined by pivot points at four parallelogram joints. A weight is joined to a first pivot point and a float is joined to a second pivot point. A primary mooring line is affixed to the turbine on one end and to a third pivot point at the other end. A secondary mooring line is affixed to a fourth pivot point at one end and to an anchor system at the other end.

In another embodiment a constant force mooring link with a pre-load is provided. A primary mooring line extends to a floating wind turbine and secondary mooring line extends to an anchor apparatus. A weight exerts a downward force and a float exerts an upward force. The secondary mooring cable is affixed at one end to an anchor apparatus and at the other end to a bracket. The bracket supports an upper pulley and a lower pulley. A line extends from the float, around the upper pulley to a stop. A line extends from the weight, around the lower pulley to the stop. The stop is affixed to a first end of the primary mooring line, the second end of the primary mooring line is affixed to a floating turbine. The force is said to be substantially constant as there is not a lack of force when there is no force on the turbine. When there is no force on the turbine, there remains some force on the mooring line as the weight and float provide a force that takes up slack in the mooring line. It is understood that at a full extension of the mooring line provides the full force of the mooring line attached to the anchor.

One skilled in the art understands that combinations of the aforementioned features and embodiments may also be included within the scope of the present disclosure.

DESCRIPTION

Figure 1:
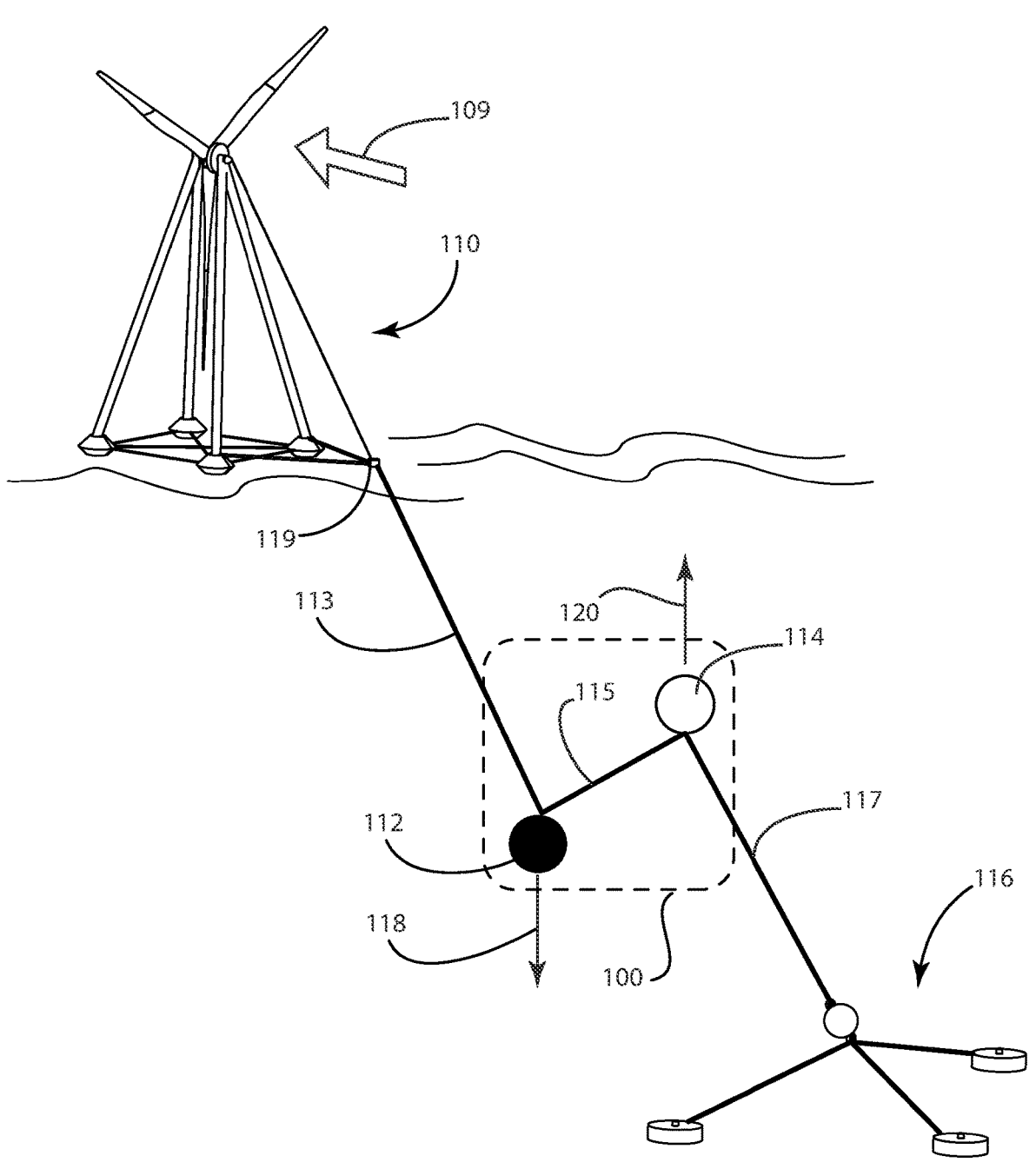
FIG. 1 is a perspective view of an example embodiment of the present disclosure.

Referring to FIG. 1 a perspective view of the embodiment 100 is depicted in the illustration. The embodiment is surrounded by dashed lines 100 and may be referred to as a controlled stiffness mooring link. Wind flowing through a floating wind turbine 110 in the direction depicted by arrow 109, exerts a force on a primary mooring cable 113. The primary mooring cable 113 extends from a hitch point 119 on the turbine 110 to a weight 112. The weight 112 is affixed to a secondary mooring line 115 that is in turn affixed to a float 114. The float 114 is affixed to a tertiary mooring cable 117 that is in turn affixed to an anchor structure 116. The float 114 provides an upward force 120 while the weight 112 provides a downward force 118. In the example embodiment the weight 112 and float 114 are configured such that the upward force 120 is equal to the downward force 118.

Figure 2:
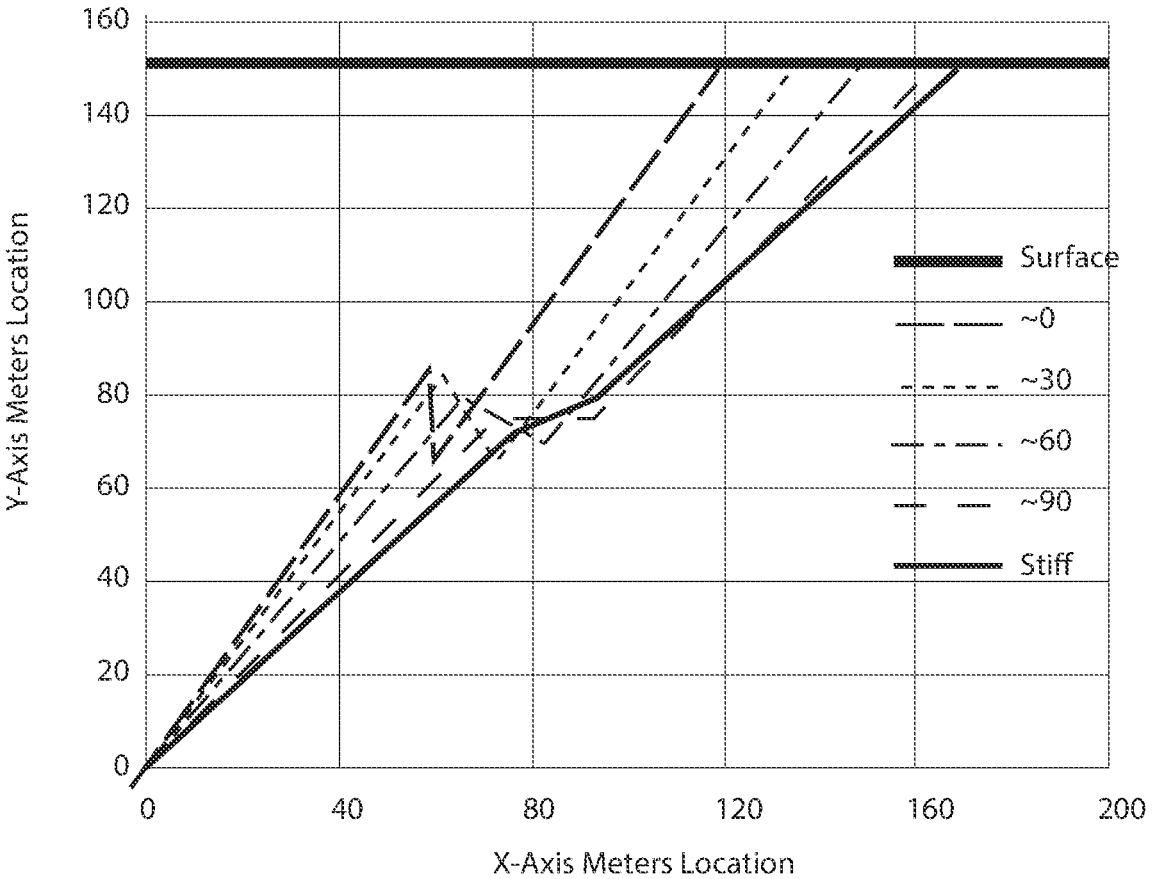
FIG. 2 is a graph showing various angles between the weight and float of the apparatus of FIG. 1.

Referring to FIG. 1 and FIG. 2, the performance of the system are depicted in the graph as the force of the wind 109 increases. When there is little to no force from the wind 109 on the turbine 110, there is similarly, little to no force on the primary mooring cable 113, and thus, the weight 112 rests beneath the float 114. In this configuration, the secondary mooring cable 115 is vertical and the system is at 0° as shown in the graph (FIG. 2). As the wind force 109 increases and hence the force on the primary mooring cable 113 increases, the weight 112 is moved upward against the downward force 118. The secondary mooring cable 115 moves away from its vertical position towards a horizontal position, thus opposing the force 120 and moving the float 114 downward. The graph shows the system at angles 30°, 60° and 90°. As force from the wind 109 continues to increase, this process continues until the majority of the force is transferred to the tertiary mooring cable 117 (FIG. 1) and the system approaches maximum stiffness (FIG. 2).

Figure 3:
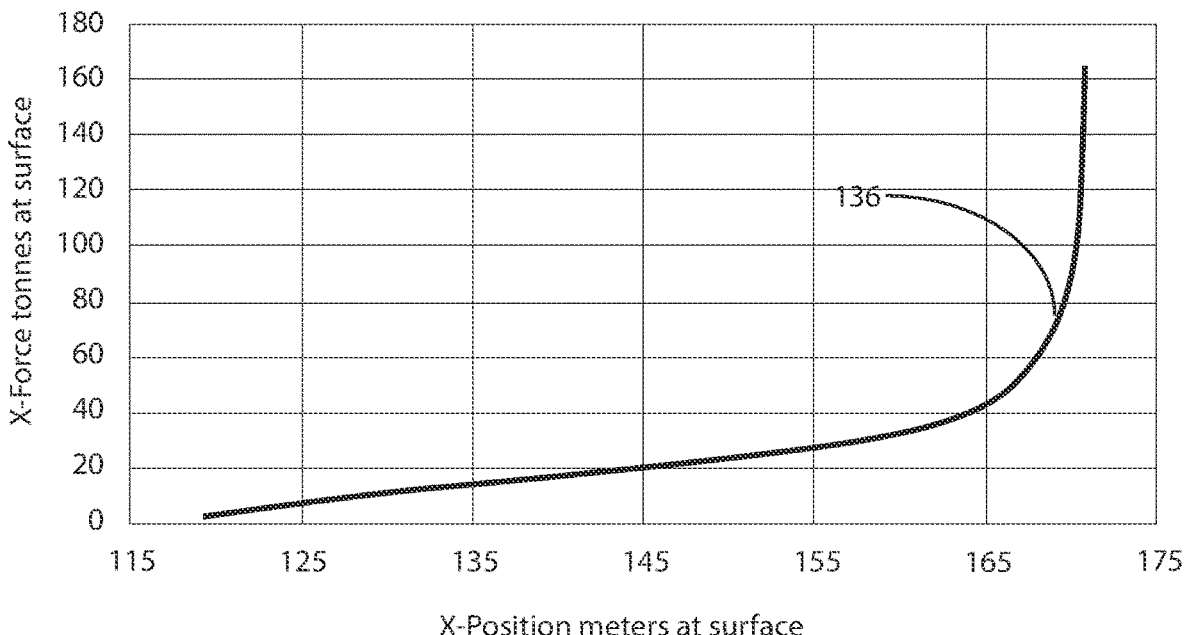
FIG. 3 is a graph depicting the horizontal force at surface versus the horizontal position of the float and weight of the apparatus of FIG. 1.

Referring to FIG. 3, a graph depicts the horizontal force at surface on the vertical axis and the horizontal position along the horizontal axis. As the horizontal displacement (D) between the weight 112 and the float 114 increases, the downward force from the weight 112, (W) with balancing upward force from the float 114(W) on the mooring line 113/115/117, exhibits approximately linear behavior with slope W/D. The curve 136 demonstrates how the system increases in stiffness as D increases.

Figure 4:
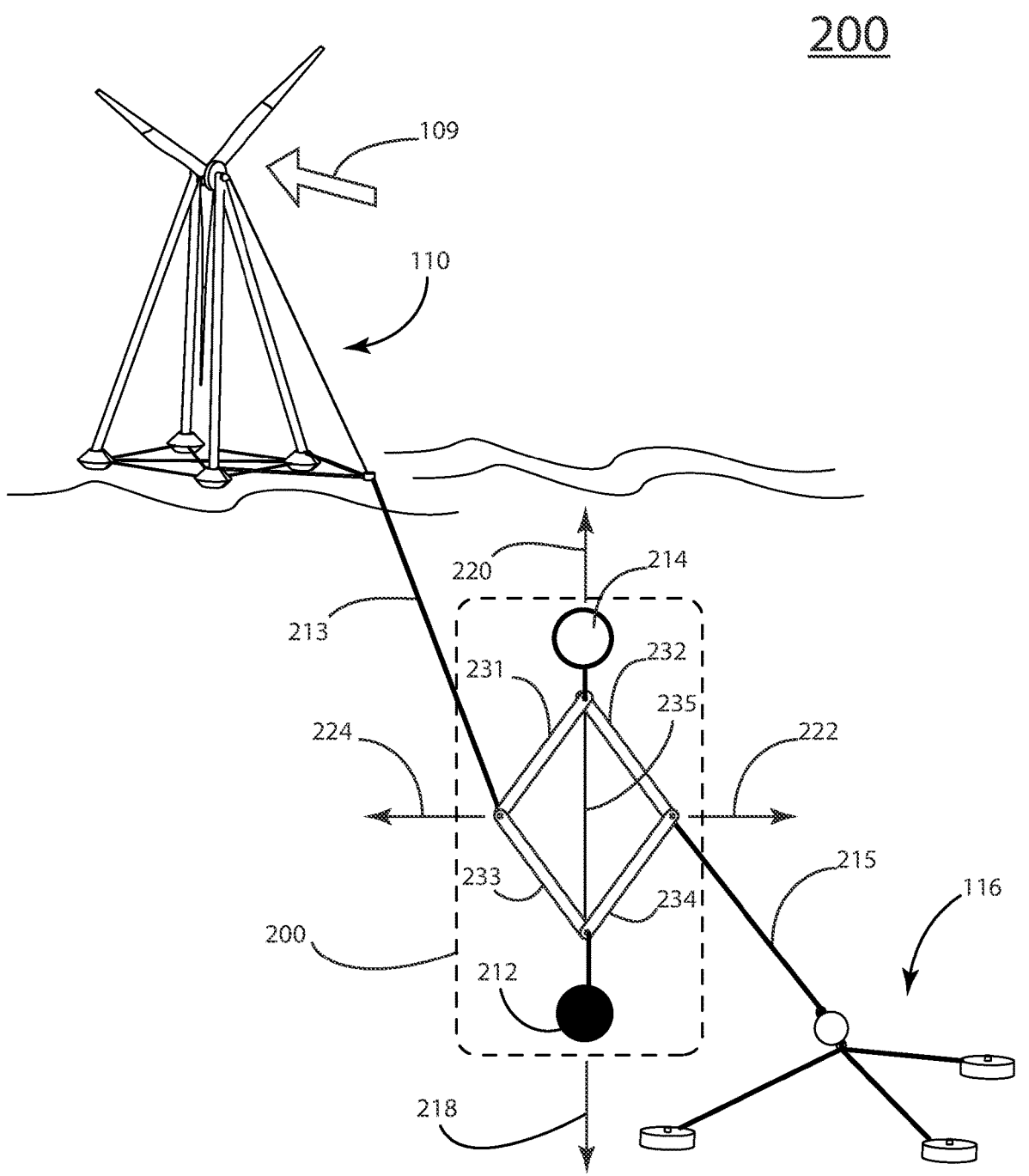
FIG. 4 is a perspective view of an iteration of the embodiment.

An iteration of the embodiment 200 is depicted in FIG. 4. Wind force 109 on the floating turbine 110 exerts a force on the primary mooring line 213. A parallelogram linkage is comprised of rigid members 231, 232, 233 and 234, joined by pivot points as shown. The apparatus 200 includes a weight 212 that is joined to a pivot point between rigid members 233 and 234. A float 214 is joined to a pivot point between rigid members 231 and 232. The primary mooring line 231 is affixed to the turbine 110 on one end and to a pivot point between rigid members 231 and 233 on the other end. A secondary mooring line 215 is affixed to a pivot point between rigid members 232 and 234 on one end and to an anchor system 116 on the other end. The parallelogram linkage has four rigid members, 231, 232, 233, 234; attached at four pivots. Two opposing pivots are affixed to and interrupt a mooring line 213, 215. The two remaining pivots are affixed to and interrupt a line that extends between the float 214 and the weight 212.

Figure 5:
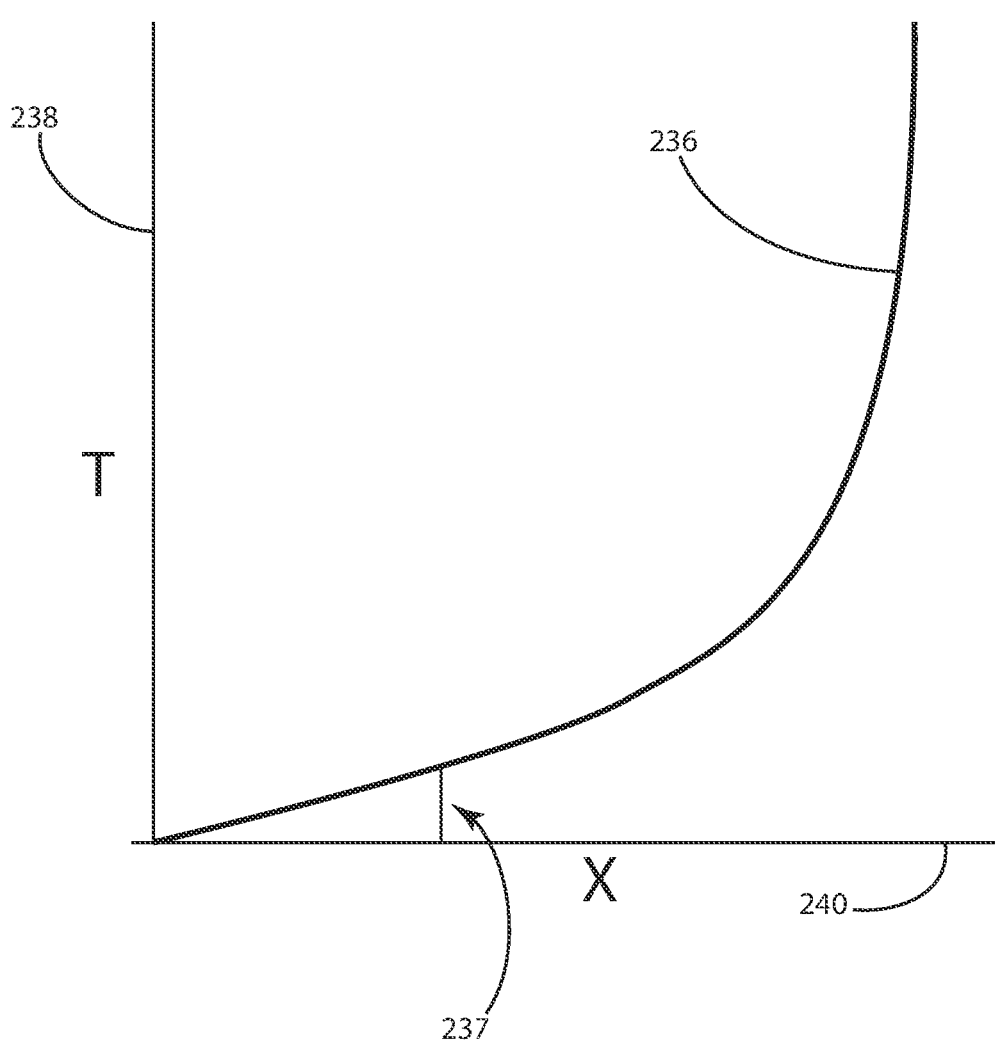
FIG. 5 is a graph depicting the tension versus distance of the apparatus of FIG. 4.

Referring to FIG. 5, a graph depicts the horizontal force at surface on the vertical axis 238 and the horizontal position along the horizontal axis 240. The curve 236 is similar to that of the curve 136 (FIG. 3). The cable 235 at a specific length creates a cut-off, also referred to as a preload signified by line 237. One skilled in the art understands that the cable 235 holds a specific distance between the weight 212 and the float 214 (FIG. 4), and that this provides a pre-load 224 on the primary mooring line 213 and a pre-load 222 on secondary mooring line 215. One skilled in the art understands that a change in the length of cable 235, changes the amount of pre-load.

Figure 6:
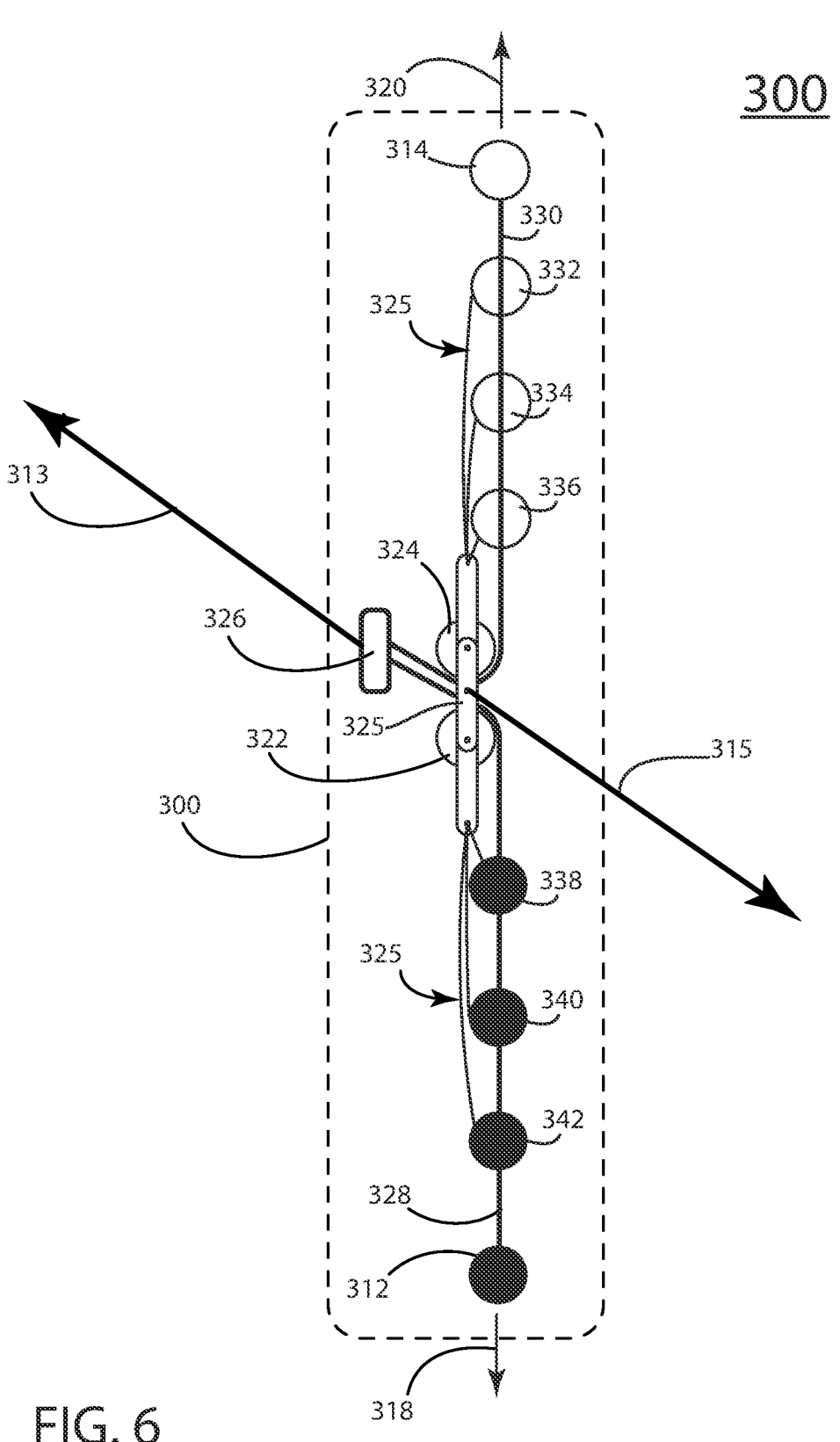
FIG. 6 is a side view of an iteration of the embodiment.

Referring to FIG. 6, an iteration of the embodiment is shown in side view. The embodiment 300 may be referred to as a varying force mooring link with a pre-load. A mooring line may be said to be interrupted, the result being a primary mooring line and a secondary mooring line, the interruption providing a space between the primary and secondary mooring lines. A primary mooring line 313 extends to a floating wind turbine and secondary mooring line 315 extends to an anchor apparatus. A weight 312 affixed to line 328 and exerts a downward force 318. And a float 314 is affixed to line 330 and exerts an upward force 320. A series of weights 338, 340 and 342 represent any number of weights through which line 328 passes. One skilled in the art understands that as weight 312 is lifted it will lift each subsequent weight as the weight is encountered. Similarly a series of floats 332, 334 and 336 represent any number of floats, restrained from rising by lines from bracket 325, through which line 330 passes. One skilled in the art understands that as float 314 is submerged it will submerge each subsequent float as the float is encountered.

The secondary mooring cable is affixed at one end to an anchor apparatus and at the other end to a bracket 325. The bracket 325 supports an upper pulley 324 and a lower pulley 322. A line 330 extends from the float 314, around the upper pulley 324 to a stop 326. A line 328 extends from the weight 312, around the lower pulley 322 to the stop 326. The stop 326 is affixed to a first end of the primary mooring line 313, the second end of the primary mooring line 313 is affixed to a floating turbine 110 (FIG. 1).

Figure 7:
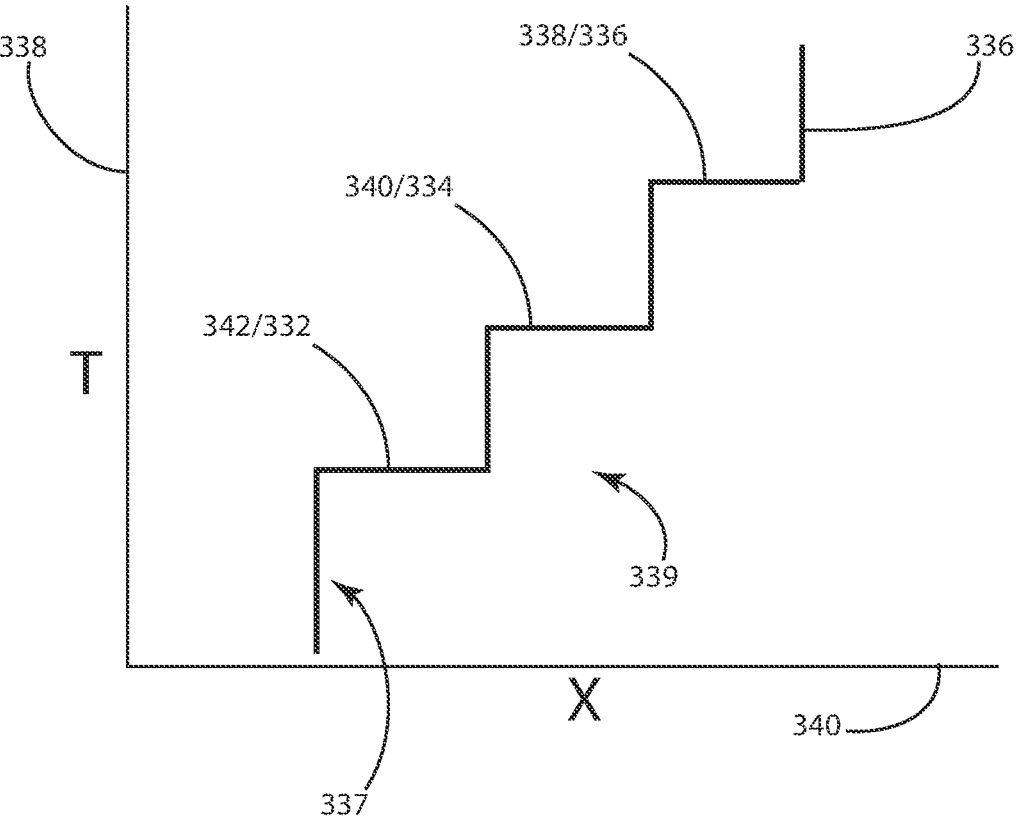
FIG. 7 is a graph depicting the tension versus distance of the apparatus of FIG. 6.

The graph in FIG. 7 demonstrates the performance of the apparatus 300 of FIG. 6. The graph depicts the horizontal force acting on the floating turbine on the vertical axis 338 and the horizontal position of the floating turbine along the horizontal axis 340. A similar plot could be made of the axial tension in the mooring lines 313 and 315 as the distance from stopper to bracket is increased. The curve 336 demonstrates that the system provides an increasing force 339 once slack on the primary and secondary mooring lines 313, 315 is removed, thus providing the pre-load 337. The force increases as the weights and floats are added to the system, a first step shows the addition of weight 342 and float 332, a second step shows the addition of weight 340 and float 334 and a third step shows the addition of weight 338 and float 336. One skilled in the art understands that any number of floats may be added in this manner.

Figure 8:
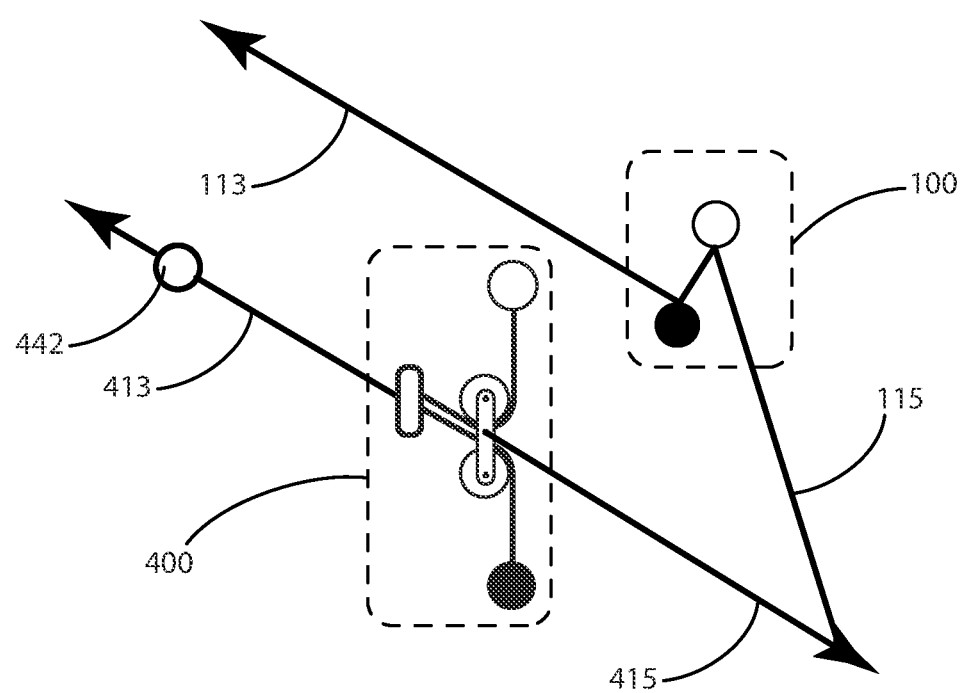
FIG. 8 is a side view of a combination of the iterations of FIG. 1 and FIG. 6.

Referring to FIG. 8 an iteration of the embodiment is shown in side view, the iteration combines a controlled stiffness mooring link of the apparatus 100 of FIG. 1 in parallel with a constant force mooring link with a pre-load of the apparatus 400 of FIG. 6. The constant force with a pre-load 400 is employed to provide an additional constant force to the primary system 100 when excessive wind force is exerted on the turbine 110 (FIG. 1). Primary mooring line 113 extends to a floating turbine 110 (FIG. 1). Mooring line 413 extends to a winch 442 that is in turn affixed to the floating wind turbine 110 (FIG. 1). A pair of secondary mooring lines 115, 415 extend to an anchor apparatus 116 (FIG. 1). The mooring line 413 remains slack until needed to exert a constant force against a given threshold force at which time the slack is taken up by winch 442.

Figure 9:
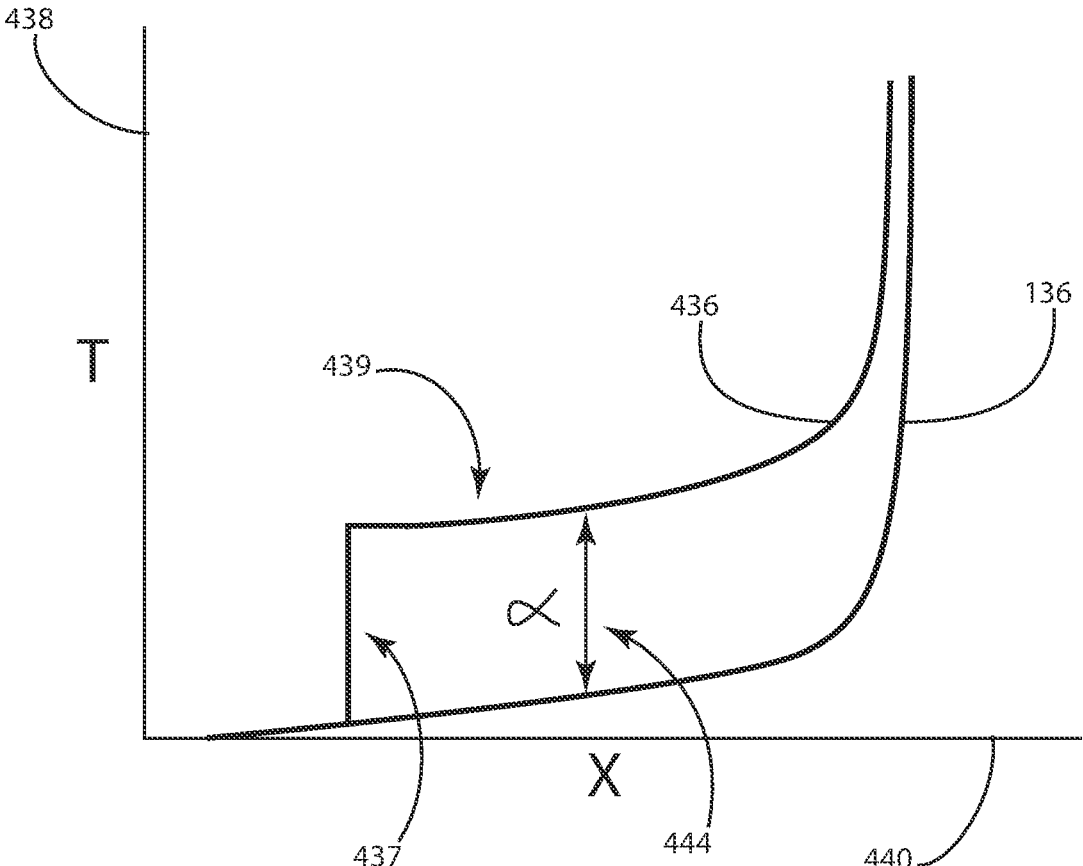
FIG. 9 is a graph depicting the tension versus the distance of the apparatus of FIG. 8.

The graph in FIG. 9 demonstrates the performance of the apparatus 400 of FIG. 8. The graph depicts the horizontal force at surface on the vertical axis 438 and the horizontal position along the horizontal axis 440. The curve 136 demonstrates the performance of the apparatus 100. The curve 436 demonstrates additional force 444 provided by the apparatus 400 to the system when slack in the mooring line 413 is taken up by winch 442. The additional force 444 has a pre-load 437 and a relatively constant force 439.

Figure 10:
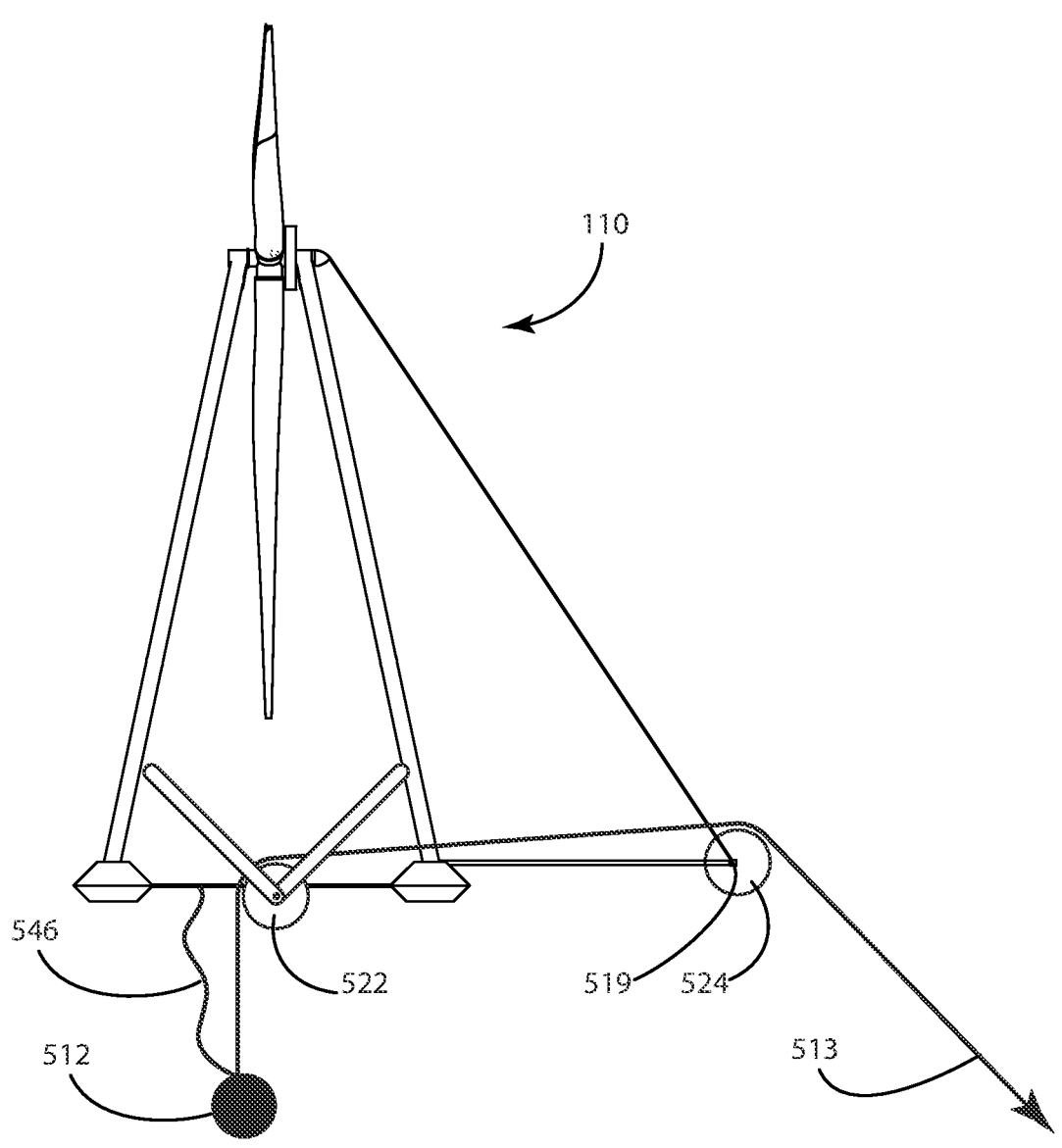
FIG. 10 is a side view of an iteration of the embodiment.

Another embodiment 500 is depicted in FIG. 10. A floating turbine 110 has a mooring line 513 that is affixed to an anchor apparatus 116 (FIG. 1). The mooring line goes through a pulley 524 that is mounted at a hitch point 519 on the turbine 110. The mooring line 513 continues to a second pulley 522 mounted on the turbine structure and in turn is affixed to a weight 512. A pre-load may be achieved with a limit cable 546. In some embodiments, a variable weight 512 is achieved by introducing air or water into a cavity in the weight 512. One skilled in the art understands that the weight 512 may also be suspended from the turbine structure above the water.

Figure 11:
FIG. 11 is a side view of an iteration of the embodiment.

An additional embodiment 600, is similar to that of FIG. 10. In the embodiment 600 depicted in FIG. 11, the iteration employs a float 614. A mooring line 613 is affixed at a first end to an anchor apparatus 116 (FIG. 1). The mooring line 613 passes through a pulley 624 that is mounted on a hitch point 619 on the turbine structure. The mooring line 613 than passes through pulley 622 and is affixed to a float 614. The float provides constant tension on the mooring line as wind thrust varies. One skilled in the art understands that a variable force from the float 614 may be achieved by adding or removing water from the float 614.

Figure 12:
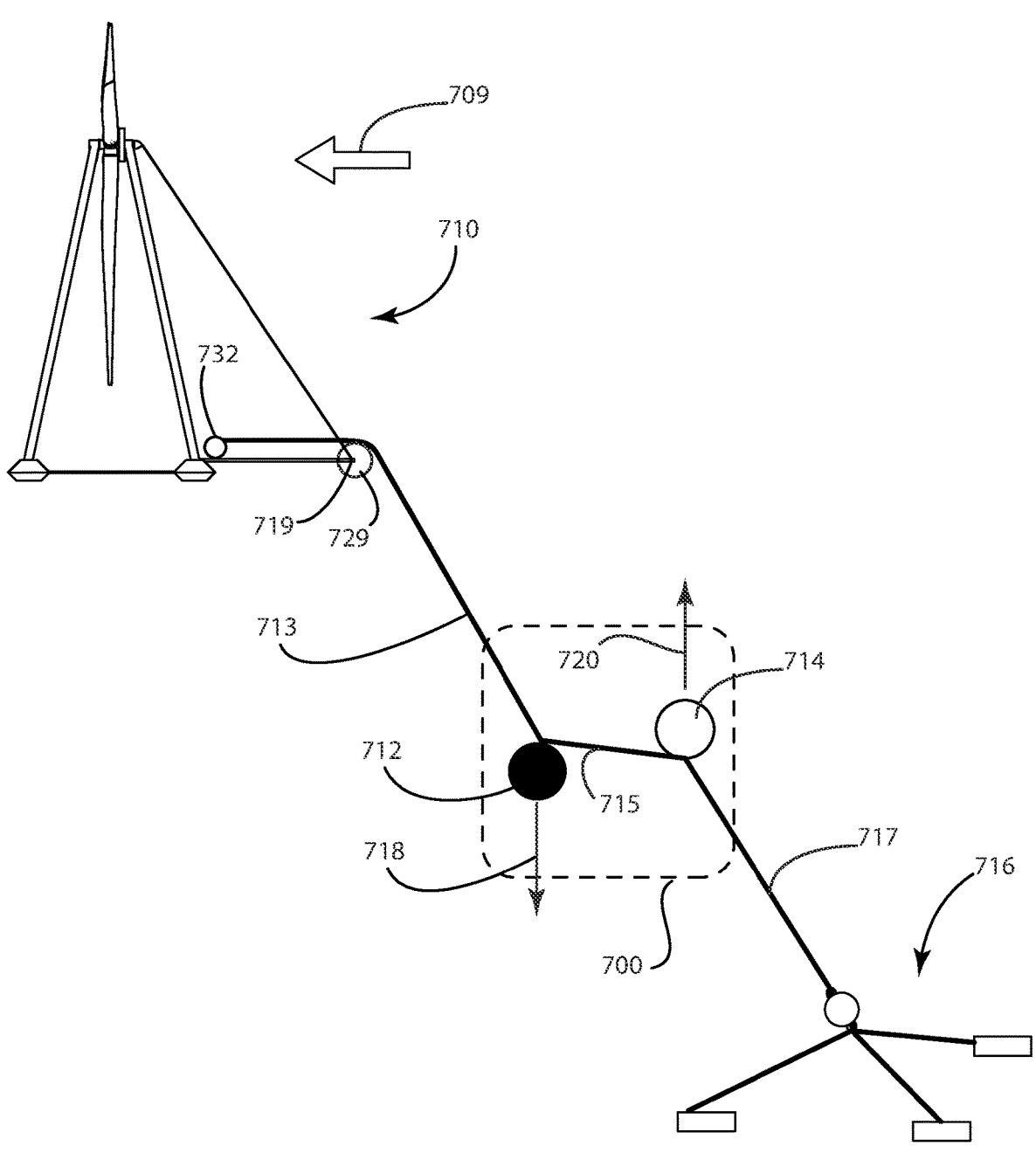
FIG. 12 is a perspective view of an iteration of the present disclosure.

Referring to FIG. 12 an iteration of the embodiment 700 is depicted in the illustration. A single mooring cable may be said to be made up of a primary mooring cable 713, a secondary mooring cable 715, and a tertiary mooring cable 717. One skilled in the art understands that the primary, secondary and tertiary mooring cables may be said to be one mooring cable with three sections. An anchor structure 716 is fastened to the seabed and affixed to a tertiary mooring cable 717 that is in turn affixed to a float 714. The float 714 is affixed to a secondary mooring cable 715 that is in turn affixed to a weight 712. The weight is affixed to a primary mooring cable 713 that passes the turbine hitch-point 719 and ends in a winch 732. In some embodiments the mooring cable 713 passes through a pulley 729 that rotates about the hitch-point 719.

When there is force from the wind 709 on the turbine 710, there is similarly, force on the primary mooring cable 713, and thus, the weight 712 is moved upward and approaches the depth of float 714. The secondary mooring cable 715 moves towards a horizontal position, thus opposing the force 720 and moving the float 714 downward. As force from the wind 709 continues to increase, this process continues until the majority of the force is transferred to the tertiary mooring cable 717 and the system approaches maximum stiffness. At maximum stiffness the turbine is relatively further from the mooring 716 than when the system is at minimum stiffness. In some embodiments the primary mooring cable 713 passes through a pulley at the hitch-point 719 and is then connected to a winch 732. As the primary mooring cable 713 is wound about the winch 732, the turbine may be moved toward the anchor structure 716.

The invention claimed is:

1. An apparatus for mooring a vessel comprising:
a mooring line having a first end and a second end, said first end fixedly engaged with said vessel and said second end fixedly engaged with an anchor; and
a float fixedly engaged with said mooring line; and
a weight fixedly engaged with said mooring line; and
a parallelogram linkage having four rigid members joined at four pivots; and
a first pair of opposing pivots fixedly engaged with, an interrupted portion of said mooring line; and
a second pair of opposing pivots fixedly engaged with, an interrupted portion of a line that extends between said float and said weight; wherein the apparatus provides substantially constant force between said anchor and said vessel.

2. The apparatus of claim 1 further comprising:
a winch fixedly engaged with said vessel and further engaged with said mooring line first end; and
a pulley rotationally engaged with said vessel; wherein
said mooring line extends from said winch, through said pulley to said anchor.

3. The apparatus of claim 1 further comprising
a limiting-line extending between said second pair of opposing pivots; wherein
a distance between said float and said weight is limited by the length of said limiting-line providing a pre-load to the parallelogram linkage.

4. The apparatus of claim 3 wherein said vessel is a floating wind turbine.

5. An apparatus for mooring a vessel comprising;
a mooring line having a first end and a second end, said first end fixedly engaged with said vessel and said second end fixedly engaged with an anchor; and
a stop fixedly engaged with an interrupted portion of said mooring line proximal to said mooring line first end; and
a bracket fixedly engaged with said interrupted portion of said mooring line proximal to said mooring line second end; and
said bracket having an upper end and a lower end, said upper end pivotally engaged with a first pulley; and said lower end pivotally engaged with a second pulley; and
a float line extending from said stop, through said upper pulley to at least one float; and
a weight line extending from said stop, through said lower pulley to at least one weight; wherein
the apparatus provides substantially constant force between said anchor and said vessel.

6. The apparatus of claim 5 further comprising:
said float line extending from said stop, through said upper pulley to a plurality of floats; and said weight line extending from said stop, through said lower pulley to a plurality of weights; and
a first set of limit lines extending from said bracket to each of said plurality of floats; and
a second set of limit lines extending from said bracket to each of said plurality of weights; wherein
force on said mooring line increases as said plurality of floats and said plurality of weights are engaged.

7. The apparatus of claim 5 further comprising:
a second mooring line having a first end and a second end, said first end fixedly engaged with said vessel and said second end fixedly engaged with said anchor; and
a secondary float fixedly engaged with said second mooring line; and
a secondary weight fixedly engaged with said second mooring line.

* * * * *